US011518901B2

(12) United States Patent
Tamura et al.

(10) Patent No.: US 11,518,901 B2
(45) Date of Patent: Dec. 6, 2022

(54) COMPOSITION AND COATING FILM

(71) Applicant: DAIKIN INDUSTRIES, LTD., Osaka (JP)

(72) Inventors: Eisuke Tamura, Osaka (JP); Seitaro Yamaguchi, Osaka (JP); Hiromichi Momose, Osaka (JP); Tomohiro Shiromaru, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 600 days.

(21) Appl. No.: 16/486,221

(22) PCT Filed: Feb. 23, 2018

(86) PCT No.: PCT/JP2018/006713
§ 371 (c)(1),
(2) Date: Aug. 15, 2019

(87) PCT Pub. No.: WO2018/163863
PCT Pub. Date: Sep. 13, 2018

(65) Prior Publication Data
US 2020/0056065 A1 Feb. 20, 2020

(30) Foreign Application Priority Data

Mar. 7, 2017 (JP) .............................. JP2017-042936

(51) Int. Cl.
| | | |
|---|---|---|
| *C09D 127/18* | (2006.01) | |
| *A47J 36/02* | (2006.01) | |
| *C09D 5/02* | (2006.01) | |
| *C09D 127/22* | (2006.01) | |
| *C09D 179/08* | (2006.01) | |
| *C09D 181/04* | (2006.01) | |
| *C09D 181/06* | (2006.01) | |

(Continued)

(52) U.S. Cl.
CPC .......... *C09D 127/18* (2013.01); *A47J 36/025* (2013.01); *C09D 5/02* (2013.01); *C09D 127/22* (2013.01); *C09D 179/08* (2013.01); *C09D 181/04* (2013.01); *C09D 181/06* (2013.01)

(58) Field of Classification Search
None
See application file for complete search history.

(56) References Cited

U.S. PATENT DOCUMENTS

| 4,139,576 A | 2/1979 | Yoshimura et al. |
|---|---|---|
| 5,502,097 A | 3/1996 | Saito |

(Continued)

FOREIGN PATENT DOCUMENTS

| EP | 3 269 786 A1 | 1/2018 |
|---|---|---|
| JP | 53-74532 A | 7/1978 |

(Continued)

OTHER PUBLICATIONS

International Search Report for PCT/JP2018/006713 dated May 22, 2018 (PCT/ISA/210).

(Continued)

*Primary Examiner* — Ramsey Zacharia
(74) *Attorney, Agent, or Firm* — Sughrue Mion, PLLC

(57) ABSTRACT

The invention provides a composition that can provide a film exhibiting excellent adhesion to a substrate and having excellent non-stickiness. The composition contains a fluororesin, a heat-resistant resin, water, and a solvent having a boiling point of 205° C. or higher.

16 Claims, 1 Drawing Sheet

(51) Int. Cl.
 *C09D 181/02* (2006.01)
 *C08L 27/12* (2006.01)
 *C08L 81/02* (2006.01)
 *C08L 81/06* (2006.01)
 *C08L 101/00* (2006.01)
 *C09D 127/12* (2006.01)
 *C09D 201/00* (2006.01)
 *C08L 79/08* (2006.01)
 *C08L 81/04* (2006.01)

(56) References Cited

U.S. PATENT DOCUMENTS

| | | |
|---|---|---|
| 5,820,742 A | 10/1998 | Oda et al. |
| 5,846,645 A | 12/1998 | Yokota et al. |
| 6,664,336 B1 | 12/2003 | Tomihashi et al. |

FOREIGN PATENT DOCUMENTS

| | | |
|---|---|---|
| JP | 6-346017 A | 12/1994 |
| JP | 7-102196 A | 4/1995 |
| JP | 8-300560 A | 11/1996 |
| JP | 2002-544363 A | 12/2002 |
| JP | 2006-045490 A | 2/2006 |
| JP | 2016-089016 A | 5/2016 |
| KR | 10-2014-0013942 A | 2/2014 |
| WO | 99/32565 A2 | 7/1999 |
| WO | 00/53675 A1 | 9/2000 |
| WO | 00/69984 A1 | 11/2000 |
| WO | 2016/147790 A1 | 9/2016 |

OTHER PUBLICATIONS

Communication dated Oct. 28, 2020, from the European Patent Office in European Application No. 18764702.9.
International Preliminary Report on Patentability with English Translation of Written Opinion of the International Searching Authority for PCT/JP2018/006713 dated Sep. 10, 2019.

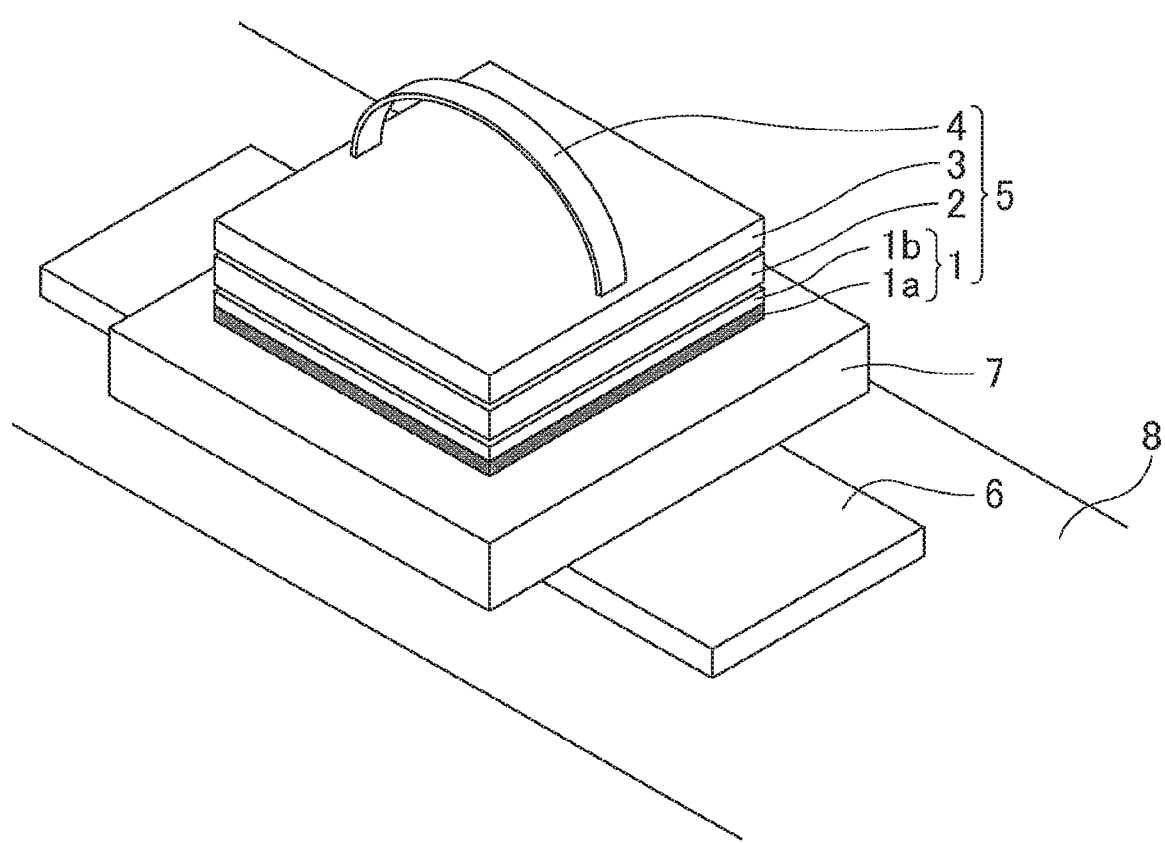

COMPOSITION AND COATING FILM

CROSS REFERENCE TO RELATED APPLICATIONS

This application is a National Stage of International Application No. PCT/JP2018/006713 filed Feb. 23, 2018, claiming priority based on Japanese Patent Application No. 2017-042936 filed Mar. 7, 2017.

TECHNICAL FIELD

The invention relates to compositions and films.

BACKGROUND ART

Cooking utensils, such as frying pans, electric griddles, pots, and inner pots of rice cookers, are typically provided with a coating layer of fluororesin having excellent properties such as heat resistance, non-stickiness, and stain resistance on a substrate of metal such as aluminum or stainless steel so as to prevent scorching or sticking of cooking ingredients during cooking with heat.

Patent Literature 1 proposes a composition for fluororesin coating containing at least three components which are a polyarylene sulfide resin, a polyamide-imide resin and/or polyimide resin, and a fluororesin, each of which is dispersed in a liquid medium.

Patent Literature 2 proposes an aqueous curing composition of a fluoroelastomer containing a fluoroelastomer, a fluororesin, a curing agent, and at least one additive component selected from the group consisting of surfactants which leave 0.3 wt % or less of decomposition residue after being heated at 300° C. for 30 minutes and polar solvents having a boiling point of 300° C. or less and a surface tension of at least 30 dyne/cm at room temperature.

CITATION LIST

Patent Literature

Patent Literature 1: JP S53-74532 A
Patent Literature 2: WO 00/53675

SUMMARY OF INVENTION

Technical Problem

Conventional techniques fail to provide both sufficient adhesion between a film and a substrate and sufficient non-stickiness of the film.

In view of the above state of the art, the invention aims to provide a composition that can provide a film exhibiting excellent adhesion to a substrate and having excellent non-stickiness, and the film.

Solution to Problem

The inventors found that the above issues can be solved by the use of a solvent having a boiling point within a predetermined range, thereby completing the invention.

Specifically, the invention relates to a composition containing a fluororesin, a heat-resistant resin, water, and a solvent having a boiling point of 205° C. or higher.

The fluororesin and the heat-resistant resin preferably have a mass ratio of 1/99 to 40/60.

The fluororesin and the heat-resistant resin are preferably present in a total amount of 20 to 50% by mass relative to a total amount of the fluororesin, the heat-resistant resin, the water, and the solvent.

The solvent is preferably present in an amount of 5 to 50% by mass relative to a total amount of the fluororesin, the heat-resistant resin, the water, and the solvent.

The fluororesin is preferably a melt-fabricable fluororesin.

The heat-resistant resin is preferably a polyarylene sulfide or a polyethersulfone.

The heat-resistant resin preferably contains a polyarylene sulfide or a polyethersulfone and a polyamideimide.

The solvent preferably contains at least one selected from the group consisting of diethylene glycol, triethylene glycol, tetraethylene glycol, glycerol, diethylene glycol monobutyl ether, tripropylene glycol monomethyl ether, triethylene glycol monomethyl ether, triethylene glycol monobutyl ether, polyethylene glycol monomethyl ether, triethylene glycol dimethyl ether, tetraethylene glycol dimethyl ether, polyethylene glycol dimethyl ether, and 1,4-butanediol.

The composition is preferably a coating material.

The composition is preferably a one-coat coating material.

The invention also relates to a film formed from the composition.

The invention also relates to a cooking utensil including the film.

The invention also relates to a rice cooker including an inner pot that includes the film.

The invention also relates to a film containing a fluororesin and a heat-resistant resin, the film being formed from a composition that contains water, the film having an adhesiveness value of 20.0 g/cm$^2$ or lower to mochi in a mochi adhesion test.

The film preferably exhibits a result of 100/100 in a cross-cut test.

The invention also relates to a laminate including a substrate and the film on the substrate.

Advantageous Effects of Invention

The composition of the invention has any of the above structures, and thus is to be applied directly to a substrate, and the resulting film exhibits excellent adhesion to the substrate and also has excellent non-stickiness. The coating composition of the invention is therefore useful as a one-coat coating material.

The film of the invention has any of the above structures. Thus, when provided on a substrate, the film firmly adheres to the substrate and has excellent non-stickiness. Even when the two layers, i.e., the film and the substrate alone are used to form a laminate, these two layers are firmly bonded to each other and the laminate has excellent non-stickiness.

BRIEF DESCRIPTION OF THE DRAWINGS

FIG. 1 schematically illustrates a method of a mochi (Japanese rice cake) adhesion test,

DESCRIPTION OF EMBODIMENTS

The invention is specifically described hereinbelow.

The composition of the invention contains a solvent having a boiling point of 205° C. or higher. This feature enables formation of a film exhibiting excellent adhesion to a substrate and having excellent non-stickiness.

The solvent has a boiling point of 205° C. or higher. A solvent having too low a boiling point may cause a failure in forming a film having excellent non-stickiness. The boiling point is preferably 220° C. or higher, more preferably 235° C. or higher, still more preferably 265° C. or higher. The boiling point may also be 300° C. or lower.

The boiling point is a value measured at 1 atm.

In the case of combination use of two or more solvents, at least one solvent thereof has a boiling point of 205° C. or higher.

The solvent preferably has a surface tension of 25 dyn/cm or higher. The solvent having a surface tension within the above range enables formation of a film having much better non-stickiness. The surface tension is more preferably 35 dyn/cm or higher, still more preferably 44 dyn/cm or higher. The surface tension is also preferably 72 dyn/cm or lower.

The surface tension can be determined by a method such as a plate method, a ring method, or a pendant drop method. The surface tension is a value at a solvent temperature of 20° C.

The solvent preferably contains at least one selected from the group consisting of diethylene glycol, triethylene glycol, tetraethylene glycol, glycerol, diethylene glycol monobutyl ether, tripropylene glycol monomethyl ether, triethylene glycol monomethyl ether, triethylene glycol monobutyl ether, polyethylene glycol monomethyl ether, triethylene glycol dimethyl ether, tetraethylene glycol dimethyl ether, polyethylene glycol dimethyl ether, and 1,4-butanediol, more preferably at least one selected from the group consisting of didethylene glycol, triethylene glycol, tetraethylene glycol, glycerol, tripropylene glycol monomethyl ether, triethylene glycol monomethyl ether, triethylene glycol monobutyl ether, polyethylene glycol monomethyl ether, triethylene glycol dimethyl ether, tetraethylene glycol dimethyl ether, and polyethylene glycol dimethyl ether. The solvent still more preferably contains at least one selected from the group consisting of triethylene glycol, tetraethylene glycol, glycerol, triethylene glycol monobutyl ether, polyethylene glycol monomethyl ether, triethylene glycol dimethyl ether, tetraethylene glycol dimethyl ether, and polyethylene glycol dimethyl ether, particularly preferably at least one selected from the group consisting of triethylene glycol, tetraethylene glycol, and glycerol.

The solvent in the composition is preferably present in an amount of 5 to 50% by mass, more preferably 10% by mass or more, still more preferably 15% by mass or more, while more preferably 40% by mass or less, still more preferably 30% by mass or less, relative to the total amount of the fluororesin, the heat-resistant resin, the water, and the solvent constituting the composition. The solvent in an amount within the above range enables formation of a film exhibiting much better adhesion to a substrate and having much better non-stickiness.

The composition of the invention further contains a fluororesin. The fluororesin is a polymer containing a fluorine atom that directly binds to a carbon atom constituting the main chain or a side chain.

The fluororesin is preferably melt-fabricable. A melt-fabricable fluororesin enables formation of a film having much better non-stickiness. The term "melt-fabricable" means that the polymer can be molten and processed using a conventional processing device such as an extruder or an injection molding device. The fluororesin therefore typically has a melt flow rate (MFR) of 0.01 to 100 g/10 min.

The MFR as used herein is a value obtained as the mass (g/10 min) of a polymer that flows out of a nozzle having an inner diameter of 2 mm and a length of 8 mm per 10 minutes at a measurement temperature (e.g., 372° C. for PFA and FEP to be described later, 297° C. for ETFE) and a load (e.g., 5 kg for PFA, FEP, and ETFE), each determined in accordance with the type of the fluoropolymer, in conformity with ASTM D 1238 using a melt indexer (Yasuda Seiki Seisakusho Ltd.).

The fluororesin preferably has a melting point of 100° C. to 333° C., more preferably 140° C. or higher, still more preferably 160° C. or higher, particularly preferably 180° or higher, while more preferably 332° C. or lower.

The melting point of the fluorine-containing polymer as used herein is the temperature corresponding to the maximum value on a heat-of-fusion curve obtained by increasing the temperature at a rate of 10° C./min using a differential scanning calorimeter (DSC).

Examples of the fluororesin include low-molecular-weight polytetrafluoroethylene (PTFE), tetrafluoroethylene (TFE)/perfluoro(alkyl vinyl ether) (PAVE) copolymers (PFA), TFE/hexafluoropropylene (HFP) copolymers (FEP), ethylene (Et)/TFE copolymers (ETFE), Et/TFE/HFP copolymers, polychlorotrifluoroethylene (PCTFE), chlorotrifluoroethylene (CTFE)/TFE copolymers, Et/CTFE copolymers, and polyvinylidene fluoride (PVDF). The fluororesin preferably contains at least one selected from the group consisting of PFA and PEP, and is more preferably FEP.

The low-molecular-weight PTFE is a PTFE having a number average molecular weight of 600000 or less. "High-molecular weight PTFE" having a number average molecular weight of more than 600000 is non melt-processible and exhibits fibrillatability that is peculiar to PTFE (for example, see JP H10-147617 A).

The low-molecular-weight PTFE may be either a modified polytetrafluoroethylene (hereafter, also referred to as a "modified PTFE") or a homo-polytetrafluoroethylene (hereafter, also referred to as a "homo-PTFE").

The modified PTFE is a modified PTFE containing tetrafluoroethylene (TFE) and a monomer other than TEE (hereafter, also referred to as a "modifying monomer").

The modifying monomer may be any one copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; and ethylene. A single modifying monomer may be used, or a plurality of modifying monomers may be used.

Examples of the perfluorovinyl ethers include, but are not limited to, unsaturated perfluoro compounds represented by the following formula (1):

$$CF_2=CF-ORf \qquad (1)$$

(wherein Rf is a perfluoro organic group). The "perfluoro organic group" as used herein means an organic group in which all hydrogen atoms binding to any carbon atom are replaced by fluorine atoms. The perfluoro organic group may have ether oxygen.

Examples of the perfluorovinyl ethers include perfluoro (alkyl vinyl ether) (PAVE) represented by the formula (1) in which Rf is a C1-C10 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. The perfluoroalkyl group is preferably a perfluoropropyl group. In other words, the PAVE is preferably perfluoropropyl vinyl ether (PPVE).

Examples of the perfluorovinyl ethers further include those represented by the formula (1) in which Rf is a C4-C9 perfluoro (alkoxyalkyl) group, those represented by the formula (1) in which Rf is a group represented by the following formula:

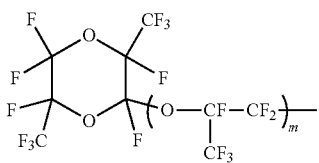
[Chem. 1]

(wherein m is 0 or an integer of 1 to 4), and those represented by the formula (1) in which Rf is a group represented by the following formula:

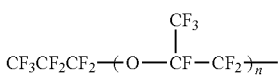
[Chem. 2]

(wherein n is an integer of 1 to 4).

Examples of the perfluorcalkyl ethylenes (PFAEs) include, but are not limited to, perfluorobutylethylene (PFBE) and perfluorohexylethylene.

The modifying monomer in the modified PTFE is preferably at least one selected from the group consisting of HEP, CTFE, VDF, PAVE, PFAE, and ethylene. The modifying monomer is more preferably PAVE, still more preferably PPVE.

The homo-PTFE substantially consists only of a TFE unit and is preferably, for example, one obtained without any modifying monomer.

The modified PTFE preferably contains a modifying monomer unit in an amount of 0.001 to 2 mol %, more preferably 0.001 to 1 mol %.

The amounts of the respective monomers constituting the PTFE as used herein can be calculated by appropriate combination of NMR, FT-IR, elemental analysis, and X-ray fluorescence analysis in accordance with the types of the monomers.

The PFA is preferably, but not limited to, a copolymer including a TEE unit and a PAVE unit at a mole ratio (TFE unit/PAVE unit) of 70/30 or higher and lower than 99/1. The mole ratio is more preferably 70/30 or higher and 98.9/1.1 or lower, still more preferably 80/20 or higher and 98.9/1.1 or lower. Too small an amount of the TFE unit tends to cause lowered mechanical properties. Too large an amount of the TFE unit tends to cause an excessively high melting point, reducing the moldability. The PFA is also preferably a copolymer containing 0.1 to 10 mol % of a monomer unit derived from a monomer copolymerizable with TFE and PAVE and 90 to 99.9 mol % in total of the TFE unit and the PAVE unit. Examples of the monomer copolymerizable with TFE and PAVE include HFP; vinyl monomers represented by $CZ^3Z^4=CZ^5(CF_2)_hd n^6$ (wherein $Z^3$, $Z^4$, and $Z^5$ are the same as or different from each other, and are each a hydrogen atom or a fluorine atom; $Z^6$ is a hydrogen atom, a fluorine atom, or a chlorine atom; and n is an integer of 2 to 10); and alkyl perfluorovinyl ether derivatives represented by $CF_2=CF-OCH_2-Rf^7$ (wherein $Rf^7$ is a C1-05 perfluoroalkyl group).

The PFA preferably has a melting point of 180° C. or higher and lower than 322° C., more preferably 230° C. to 320° C., still more preferably 280° C. to 320° C.

The PFA preferably has a melt flow rate (MFR) of 1 to 100 g/10 min.

The PEA preferably has an initial pyrolysis temperature of 380° C. or higher. The initial pyrolysis temperature is more preferably 400° C. or higher, still more preferably 410° C. or higher.

The initial pyrolysis temperature as used herein means the temperature at which the amount (10 mg) of a sample is reduced by 1% by mass when. the sample is heated from room temperature at a temperature-increasing rate of 10° C./min using a thermogravimetry/differential thermal analyzer (TG-DTA) (trade name: TG/DTA6200, available from Seiko Instruments Inc.).

The FEP is preferably, but not limited to, a copolymer including a TFE unit and a REP unit at a mole ratio (TFE unit/HFP unit) of 70/30 or higher and lower than 99/1. The mole ratio is more preferably 70/30 or higher and 98.9/1.1 or lower, still more preferably 80/20 or higher and 98.9/1.1 or lower. Too small an amount of the TFE unit tends to cause lowered mechanical properties. Too large an amount of the TEE unit tends to cause an excessively high melting point, reducing the moldability. The FEP is also preferably a copolymer containing 0.1 to 10 mol % of a monomer unit derived from a monomer copolymerizable with TEE and HEP and 90 to 99.9 mol % in total of the TFE unit and the REP unit. Examples of the monomer copolymerizable with TFE and HFP include PAVE and alkyl perfluorovinyl ether derivatives.

The FEP preferably has a melting point of 150° C. or higher and lower than 322° C., more preferably 200° C. to 320° C., still more preferably 240° C. to 320° C.

The FEP preferably has a MFR of 1 to 100 q/10 min.

The FEP preferably has an initial pyrolysis temperature of 360° C. or higher. The initial pyrolysis temperature is more preferably 380° C. or higher, still more preferably 390° C. or higher.

The amounts of the respective monomer units in the fluororesin can be calculated by appropriate combination of NMR, FT-IR, elemental analysis, and X-ray fluorescence analysis in accordance with the types of the monomers.

The composition of the invention further contains a heat-resistant resin other than the fluorcresin.

The heat-resistant resin preferably has a continuous service temperature of 150° C. or higher.

Examples of the heat-resistant resin include polyarylene sulfides, polyethersulfones, polyamide-imides, polyimides, polyotherimides, polyether ether ketones, and aromatic polyesters.

The polyarylene sulfides (PASs) are each a resin containing a polymer that contains a repeating unit represented by the following formula:

[Chem. 3]

(wherein Ar is an arylene group). An example of the PAS is polyphenylene sulfide (PPS), although not limited thereto.

The polyethersulfones (PESs) are each a resin containing a polymer that contains a repeating unit represented by the following formula.

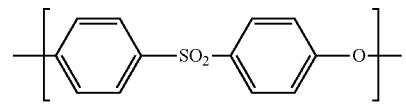
[Chem. 4]

An example of the PES is a resin containing a polymer obtainable by polycondensation of dichlorodiphenyl sulfone and bisphenol, although not limited thereto.

The polyamide-imides (PAIs) are each a resin containing a polymer that contains an amide bond and an imide bond in the molecular structure. Examples of the PAI include, but are not limited to, resins containing a high-molecular-weight polymer obtainable by a reaction such as: a reaction of an aromatic diamine containing an amide bond in the molecule and an aromatic tetravalent carboxylic acid such as pyromellitic acid; a reaction of an aromatic trivalent carboxylic acid such as trimellitic anhydride and a diamine such as 4,4-diaminophenyl ether or a diisocyanate such as diphenylmethane diisocyanate; or a reaction of a dibasic acid containing an aromatic imide ring in the molecule and a diamine. In order to achieve excellent heat resistance, the PAI is preferably one containing a polymer that contains an aromatic ring in the main chain.

The polyimides (PIs) are each a resin containing a polymer that contains an imide bond in the molecular structure. Examples of the PI include, but are not limited to, resins containing a high-molecular-weight polymer obtainable by a reaction of an aromatic tetravalent carboxylic anhydride such as pyromellitic anhydride. In order to achieve excellent heat resistance, the PI is preferably one containing a polymer that contains an aromatic ring in the main chain.

In order to provide a film exhibiting excellent adhesion to a substrate and also having excellent non-stickiness, the heat-resistant resin is preferably PAS or PES, more preferably PAS.

PAS and PES each may be used alone or in combination of two or more thereof.

The heat-resistant resin also preferably contains PAS or PES and PAI. In other words, the heat-resistant resin may be a mixture of PAS and PAI or a mixture of PES and PAI. The presence of PAI in addition to PAS or PES as the heat-resistant resin enables formation of a film exhibiting excellent secondary adhesion (adhesion to a substrate after repeated heating and cooling of the film). The heat-resistant resin more preferably contains PAS and PAI, in other words, is more preferably a mixture of PAS and PAI.

PAS, PES, and PAI each may be used alone or in combination of two or more thereof.

In the heat-resistant resin that contains PAS or PES and PAI, the PAS or PES is preferably present in an amount of 80 to 99% by mass, more preferably 90 to 95% by mass, relative to the total amount of the PAS or PES and PAI.

The fluororesin and the heat-resistant resin in the composition preferably have a mass ratio (fluororesin/heat-resistant resin) of 1/99 to 40/60, more preferably 5/95 to 30/70, still more preferably 10/90 to 25/75. The fluororesin and the heat-resistant resin having a mass ratio within the above range enable formation of a film having much better non-stickiness. This is presumably because as follows. That is, a film formed from a composition containing a relatively large amount of any of the heat-resistant resins such as polyarylene sulfides and polyethersulfones is likely to reduce permeation of water generated from cooking ingredients, for example, into the film and to promote formation of a water layer on the surface of the film. This water layer seems to reduce sticking of the cooking ingredients to the film.

The fluororesin and the heat-resistant resin in the composition are preferably present in a total amount of 20 to 50% by mass, more preferably 25% by mass or more, still more preferably 30% by mass or more, while more preferably 45% by mass or less, still more preferably 40% by mass or less, relative to the total amount of the fluororesin, the heat-resistant resin, the water, and the solvent constituting the composition. The fluororesin and the heat-resistant resin in a total amount within the above range enable formation of a film exhibiting much better adhesion to a substrate and having much better non-stickiness.

The composition of the invention further contains water. The presence of water in the composition can lead to a high viscosity and high viscousness of the composition. This can lead to improved control of coating easiness and film thickness, improving the physical properties (e.g., corrosion resistance) of the film.

In order to provide a film that is easier to handle and that has much better physical properties, the composition preferably has a solid content of 5 to 70% by mass, more preferably 10% by mass or more, while more preferably 60% by mass or less.

The composition of the invention preferably further contains a filler. The presence of a filler enables formation of a film exhibiting much better adhesion to a substrate and having much better non-stickiness, hardness at high temperature, and abrasion resistance.

The filler preferably has a new Mohs hardness of 7 or higher. The presence of a filler having a specific hardness enables formation of a film exhibiting much better adhesion to a substrate and having much better non-stickiness, hardness at high temperature, and abrasion resistance.

The filler preferably includes at least one selected from the group consisting of diamond, fluorinated diamond, corundum, silica stone, boron nitride, boron carbide, silicon carbide, silica, mica, chrysoberyl, topaz, beryl, garnet, quartz, glass flake, fused zirconia, tantalum carbide, titanium carbide, alumina, and tungsten carbide, more preferably at least one selected from the group consisting of diamond, boron carbide, silicon carbide, alumina, and fused zirconia, still more preferably diamond and silicon carbide.

Fluorinate diamond is obtainable by fluorinating diamond. Fluorination of diamond may be achieved, for example, by a known method disclosed in Abstracts of the 26th Fluorine Conference of Japan, Nov. 14, 2002, pp. 24-25. Specifically, diamond is sealed in a reactor made of a material having a corrosion resistance against fluorine such as nickel or an alloy containing nickel, and then fluorine gas is introduced there into for fluorination.

The filler in the composition is preferably present in an amount of 0.1 to 10% by mass, more preferably 0.3% by mass or more and 5.0% by mass or less, relative to the total amount of the fluororesin and the heat-resistant resin. The filler in an amount within the above range enables formation of a film exhibiting much better adhesion to a substrate and having excellent non-stickiness, hardness at high temperature, and abrasion resistance.

The composition also preferably contains a surfactant. The surfactant may be a conventionally known surfactant.

The composition may further contain an additive. Examples of the additive include, but are not limited to, leveling agents, solid lubricants, precipitation inhibitors, moisture absorbents, surface conditioners, thixotropic agents, viscosity modifiers, anti-gelling agents, ultraviolet absorbers, photostabilizers, plasticizers, anti-flooding agents, anti-skinning agents, scratch inhibitors, fungicides, antibacterial agents, antioxidants, antistatic agents, silane-coupling agents, carbon black, clay, extender pigments, scaly pigments, barium sulfate, glass, various reinforcing materials, various fillers, conductive fillers, and metal powders of gold, silver, cooper, platinum, or stainless steel.

The additive is preferably present in an amount of 0.1 to 30% by mass, more preferably 1% by mass or more and 25% by mass or less, relative to the total amount of the fluororesin and the heat-resistant resin.

The composition may be prepared by mixing the fluororesin, the heat-resistant resin, the water, and the solvent, optionally together with any of the filler, the surfactant, and the additive, by a typical mixing technique such as mixing with a mixer or a roll mill.

The composition is preferably a coating material. The composition may be an aqueous coating material.

A film can be formed by applying the composition to a substrate. The film to be formed exhibits excellent adhesion to a substrate and also has excellent non-stickiness.

Although the composition may be applied over and over, the composition can form a film having desired properties by a single application process. The composition can be suitably used as a one-coat coating material. The composition can also form a thick film by a single application process.

The composition may be applied by any method. Examples of the method include spray coating, roll coating, doctor blade coating, dip (immersion) coating, impregnation coating, spin-flow coating, and curtain-flow coating, Preferred is spray coating.

Application of the composition may be followed by drying or firing of the film. The drying is preferably performed at a temperature of 70° C. to 300° C. for 5 to 60 minutes. The firing is preferably performed at a temperature of 260° C. to 410° C. for 10 to 30 minutes.

The invention also relates to a film containing the composition (hereinafter, also referred to as a first film). The first film of the invention is formed from the composition, and thus exhibits excellent adhesion to a substrate and has excellent non-stickiness.

The invention also relates to a film that is formed from a composition containing water, that contains a fluororesin and a heat-resistant resin, and that has an adhesiveness value of 20.0 g/cm$^2$ or lower to mochi (Japanese rice cake) in a mochi adhesion test (hereinafter, also referred to as a second film). The above features allow the second film of the invention to exhibit excellent adhesion to a substrate and have excellent non-stickiness.

The second film has an adhesiveness value of 20.0 g/cm$^2$ or lower to mochi in a mochi adhesion test. The second film having an adhesiveness value within the above range is likely to reduce sticking of viscous substances such as amylose and amylopectin contained in cooking ingredients. The adhesiveness value is preferably 18.0 g/cm$^2$ or lower, more preferably 15.0 g/cm$^2$ or lower, still more preferably 14.0 g/cm$^2$ or lower. The adhesiveness value may be 0.1 g/cm$^2$ or higher.

The adhesiveness value is a value determined by the following mochi adhesion test.

A 20-μm-thick film whose adhesiveness value is to be measured is formed on a 2.0-mm-thick pure aluminum plate, whereby a coated plate (3 cm×3 cm) is produced. Two copper plates (each having a size of 3 cm×3 cm×2.0 mm) are fixed on the surface of the coated plate on the side opposite to the film using a tape having a heat resistance of 100° C. or higher. A handle is then formed of a wire on the copper plate, whereby a sample is prepared. On an electric griddle heated up to 90° C. are placed an aluminum plate (3 cm×5 cm) roughened by blasting, a piece of kiri-mochi (Sato No Slice Kiri-Mochi, available from Sato Foods Co., Ltd.), and the sample in this order. The sample is stacked such that the film is in direct contact with the kiri-mochi. The workpiece is heated at 90° C. for two and a half minutes. A spring balance is hooked to the handle and the sample is pulled in the vertical direction. The weight (g) at which the film is released from the kiri-mochi is recorded. The weight of the sample (including the copper plate, the tape, and the wire) is subtracted from the resulting weight and the difference is divided by the area (9 cm$^2$) of the coated plate. Thereby, the adhesiveness value (g/cm$^2$) of the film to the mochi is obtained.

The tape and the wire used have negligible weights relative to the sample.

FIG. 1 schematically illustrates a method of the mochi adhesion test. As illustrated in FIG. 1, an aluminum plate 6 is placed on an electric griddle 8, a kiri-mochi 7 is placed on the aluminum plate 6, and a sample 5 is placed on the kiri-mochi 7. The sample 5 includes a coated plate 1 that includes a film 1a and an aluminum plate 1b, two copper plates 2 and 3 fixed on the surface of the coated plate 1 on the side opposite to the film 1a, and a handle 4 disposed on the copper plate 3. The sample 5 is placed such that the film 1a is in direct contact with the kiri-mochi 7.

The second film also contains a fluororesin and a heat-resistant resin. In preferred embodiments, the fluororesin and the heat-resistant resin are as described above.

The fluororesin and the heat-resistant resin in the second film are preferably present in a total amount of 80 to 99% by mass, more preferably 85 to 95% by mass, of the film.

Also, the second film contains a compostion containing water. The presence of water in the composition can lead to a high viscosity and high viscousness of the composition. This can lead to improved control of coating easiness and film thickness, improving the physical properties (e.g., corrosion resistance) of the film. In other words, the second film has better physical properties than films containing a composition free from water.

The second film preferably exhibits a result of 100/100 in a cross-cut test. In this case, the second film exhibits much better adhesion to a substrate.

The cross-cut test is performed by repeating cellophane tape peeling 10 times in conformity with JIS K 5400.

The second film may be formed by applying the above composition of the invention to a substrate by the above method, optionally drying the composition, and then firing the composition, for example.

The invention also relates to a laminate including a substrate and the above second film formed on the substrate. Even when the laminate consists only of the two layers which are the substrate and the film, the two layers are firmly bonded to each other and the laminate has excellent non-stickiness. Thus, the laminate is suitably used as a cooking utensil such as a rice cooker.

The substrate may be formed of any material, and examples thereof include metals such as simple metals, including iron, aluminum, and copper, and alloys thereof; and non-metallic inorganic materials such as enamel, glass, and ceramic. An example of the alloys is stainless steel. The material of the substrate is preferably a metal, more preferably aluminum or stainless steel, still more preferably aluminum.

The substrate may be subjected to a surface treatment such as a degreasing treatment or a surface-roughening treatment, as appropriate. The surface-roughening treatment may be performed by any method, and examples thereof include chemical etching with acid or alkali, anodizing (formation of anodic oxide coating), and sandblasting.

The film preferably has a thickness of 1 to 50 μm, more preferably 5 μm or greater and 40 μm or smaller. A film having too small a thickness may have poor corrosion resistance and abrasion resistance. A film having too large a thickness may easily crack.

The film can be formed by applying the above composition of the invention to the substrate by the above method, optionally drying the composition, and then firing the composition.

The laminate may include a layer other than the substrate and the film. Still, in order to sufficiently enjoy high adhesion between the substrate and the film and excellent properties of the film, the laminate preferably consists only of the substrate and the film.

The first film of the invention, the second film of the invention, and the laminate of the invention can be used in applications utilizing properties of the fluororesin such as non-stickiness, heat resistance, and lubricity. Examples of those utilizing the non-stickiness include cooking utensils such as frying pans, pressure cookers, pots, electric skillets, rice cookers, ovens, electric griddles, bread baking pans, knives, and gas cooktops; kitchen utensils such as electric kettles, ice cube trays, metallic molds, and range hoods; parts for the food industry such as mixing rolls, rolling mills, conveyor belts, and hoppers; industrial items such as rolls for office automation (OA) equipment, belts for OA equipment, separation claws for OA equipment, paper-manufacturing rolls, and film-manufacturing calendar rolls; metal molds and releasing tools such as molds for molding expanded polystyrene, casting molds, release plates for production of plywood or decorated plywood; and industrial containers (especially, for the semiconductor industry). Examples of those utilizing the lubricity include tools such as saws and files; household utensils such as irons, scissors, and knives; metal foil and electric wires; sliding bearings for food processing equipment, packaging machinery, and spinning and weaving machinery; sliding components for cameras, clocks, and watches; automobile components such as pipes, valves, and bearings; and snow shovels, spades, and chutes.

In particular, the films and the laminate are suitably used for cooking utensils and kitchen utensils, and particularly suitably used for inner pots of rice cookers.

The invention also relates to a cooking utensil including the above first film of the invention. The invention also relates to a rice cooker including an inner pot that includes the above first film of the invention. In preferred aspects, the invention relates to a cooking utensil including the above second film of the invention, a rice cooker including an inner pot that includes the above second film of the invention, a cooking utensil including the above laminate of the invention, and a rice cooker including an inner pot that includes the above laminate of the invention.

EXAMPLES

The invention is described hereinbelow with reference to examples, but these examples are not intended to limit the invention.

The parameters in the examples were determined by the following methods.

Production of Coated Plate

A surface of a 2.0-mm-thick pure aluminum plate (A-1050P) was degreased with acetone, and then roughened by sandblasting so as to have a surface roughness Ra of 2.0 to 3.0 μm determined in conformity with JIS B 1982. Dusts on the surface were removed by air blowing. The composition obtained in one of the examples and the comparative examples was sprayed to the surface using a gravity-feed spray gun having a nozzle diameter of 1.0 mm at a spraying pressure of 0.2 MPa. The film on the aluminum plate was dried at 80° C. to 100° C. for 15 minutes. The film was then fired at 380° C. for 20 minutes. Thereby, a coated plate including a film having a thickness of about 20 μm was produced.

Mochi Adhesion Test (Non-Stickiness)

A 20-μm-thick film whose adhesiveness value was to be measured was formed on a 2.0-mm-thick pure aluminum plate, whereby a coated plate (3 cm×3 cm) was produced. Two copper plates (each having a size of 3 cm×3 cm×2.0 mm) were fixed on the surface of the coated plate on the side opposite to the film using a tape having a heat resistance of 100° C. or higher. A handle was then formed of a wire on the copper plate, whereby a sample was prepared. On an electric griddle heated up to 90° C. were placed an aluminum plate (3 cm×5 cm) roughened by blasting, a piece of kiri-mochi (Sato No Slice Kiri-Mochi, available from Sato Foods Co., Ltd.), and the sample in this order. The sample was stacked such that the film was in direct contact with the kiri-mochi. The workpiece was heated at 90° C. for two and a half minutes. A spring balance was hooked to the handle and the sample was pulled in the vertical direction. The weight (g) at which the film was released from the kiri-mochi was recorded. The weight of the sample (including the copper plate, the tape, and the wire) was subtracted from the resulting weight and the difference was divided by the area (9 cm$^2$) of the coated plate. Thereby, the adhesiveness value (g/cm$^2$) of the film to the mochi was obtained.

Cross-Cut Test (Adhesion)

The test was performed in conformity with JIS K 5400 (cellophane tape peeling was repeated 10 times).

Examples and Comparative Examples

Example 1

First component: 60% aqueous dispersion of FEP

Second component: 40% aqueous dispersion of PPS (aqueous dispersion obtained by mixing and pulverizing 40 parts by weight PPS powder, 20 parts by weight TEG, 33 parts by weight deionized water, 6 parts by weight polyoxyethylene alkyl ether, and 1 part by weight acetylene diol in a sand mill)

The components were mixed, at proportions shown in Table 1 and stirred for about 30 minutes in a stirrer, whereby a composition was prepared. A coated plate was prepared by the above method and the non-stickiness and adhesion of the film were evaluated. The results are shown in Table 1.

Example 2

The same procedures as in Example 1 were performed, except that PES powder was used instead of the PES powder. The results are shown in Table 1.

Example 3

The same procedures as in Example 1 were performed, except that a PEA aqueous dispersion was used instead of the FEP aqueous dispersion. The results are shown in Table 1.

Example 4

The same procedures as in Example 1 were performed, except that BDG was used instead of TEG. The results are shown in Table 1.

Example 5

The same procedures as in Example 1 were performed, except that BTG was used instead of TEG. The results are shown in Table 1.

Example 6

The same procedures as in Example 1 were performed, except that the ratio of the fluororesin and the binder mixed was changed. The results are shown in Table 1.

Example 7

First component: 60% aqueous dispersion of FEP
Second component: 40% aqueous dispersion of PPS (aqueous dispersion obtained by mixing and pulverizing 40 parts by weight PPS powder, 20 parts by weight TEG, 33 parts by weight deionized water, 6 parts by weight polyoxyethylene alkyl ether, and 1 part by weight acetylene diol in a sand mill)
Third component: 20% aqueous dispersion of carbon black
Fourth component: 20% aqueous dispersion of barium sulfate The components were mixed at proportions shown in Table 1 and stirred for about 30 minutes in a stirrer, whereby a composition was prepared. The following processing procedures were the same as in Example 1. The results are shown in Table 1.

Example 8

The same procedures as in Example 7 were performed, except that a solvent mixture TEG/PG=1/1 (mass ratio) was used instead of TEG. The results are shown in Table 1.

Comparative Example 1

The same procedures as in Example 1 were performed, except that deionized water was used instead of TEG. The results are shown in Table 1.

Comparative Example 2

The same procedures as in Example 1 were performed, except that MMB was used instead of TEG. The results are shown in Table 1.

Comparative Example 3

The same procedures as in Example 1 were performed, except that NMP was used instead of TEG. The results are shown in Table 1.

TABLE 1

| | | Example | | | | | | | | Comparative Example | | |
|---|---|---|---|---|---|---|---|---|---|---|---|---|
| | | 1 | 2 | 3 | 4 | 5 | 6 | 7 | 8 | 1 | 2 | 3 |
| Composition of resin | Proportion of fluororesin | 20 | 20 | 20 | 20 | 20 | 35 | 20 | 20 | 20 | 20 | 20 |
| | Proportion of binder | 80 | 80 | 80 | 80 | 80 | 65 | 80 | 80 | 80 | 80 | 80 |
| | Type of fluororesin | FEP | FEP | PFA | FEP | FEP | FEP | FEP | FEP | FEP | FEP | FEP |
| | Type of binder | PPS | PES | PPS | PPS | PPS | PPS | PPS | PPS | PPS | PPS | PPS |
| Additive (% by mass) | Carbon black | 0 | 0 | 0 | 0 | 0 | 0 | 3 | 3 | 0 | 0 | 0 |
| | Barium sulfate | 0 | 0 | 0 | 0 | 0 | 0 | 5 | 5 | 0 | 0 | 0 |
| Solvent | Amount of solvent (% by mass) | 18 | 18 | 18 | 18 | 18 | 18 | 18 | 18 | 0 | 18 | 18 |
| | Type of solvent | TEG | TEG | TEG | BDG | BTG | TEG | TEG | TEG/PG = 1/1 | — | MMB | NMP |
| | Boiling point (° C.) | 287 | 287 | 287 | 230 | 271 | 287 | 287 | TEG: 287, PG: 188 | — | 174 | 202 |
| | Surface tension (dyn/cm) | 45 | 45 | 45 | 29 | 28 | 45 | 45 | TEG: 45, PG: 72 | — | 30 | 41 |
| Non-stickiness | Kiri-mochi test (g/cm$^2$) | 1.9 | 8.7 | 2.5 | 17.2 | 14.1 | 1.9 | 14.0 | 12.0 | 20.7 | 20.2 | 20.1 |
| Adhesion | Cross-cut test (/100) | 100 | 100 | 100 | 100 | 100 | 100 | 100 | 100 | 100 | 100 | 100 |

The proportions in the table each mean the proportion by mass.

The amount of solvent in the table means the amount (% by mass) of the solvent relative to the total amount of the fluororesin, the binder (heat-resistant resin), the water, and the solvent.

The values regarding the additives in the table each mean the amount (% by mass) of the additive relative to the total amount of the fluororesin and the binder (heat-resistant resin).

The abbreviations in the examples, the comparative examples, and the table mean the following.

FEP: tetrafluorcethylene/hexafluoropropylene copolymer
PFA: tetrafluoroethylene/perfluoro(alkyl vinyl ether) copolymer
PPS: polyphenylene sulfide
PES: polyethersulfone
TEG: triethylene glycol
BDG: diethylene glycol monobutyl ether
BTG: triethylene glycol monobutyl ether
PG: propylene glycol
MMB: 3-methyl-3-methoxybutanol
NMP: N-methyl-2-pyrrolidone

REFERENCE SIGNS LIST

1: coated plate
1a: film
1b: aluminum plate
2: copper plate
3: copper plate
4: handle
5: sample
6: aluminum plate
7: kiri-mochi
8: electric griddle

The invention claimed is:

1. A composition comprising
a fluororesin,
a heat-resistant resin,
water, and
a solvent having a boiling point of 265° C. or higher,
wherein the fluororesin and the heat-resistant resin have a mass ratio of 1/99 to 40/60.

2. The composition according to claim 1,
wherein the fluororesin and the heat-resistant resin are present in a total amount of 20 to 50% by mass relative to a total amount of the fluororesin, the heat-resistant resin, the water, and the solvent.

3. The composition according to claim 1,
wherein the solvent is present in an amount of 5 to 50% by mass relative to a total amount of the fluororesin, the heat-resistant resin, the water, and the solvent.

4. The composition according to claim 1,
wherein the fluororesin is a melt-fabricable fluororesin.

5. The composition according to claim 1,
wherein the heat-resistant resin is a polyarylene sulfide or a polyethersulfone.

6. The composition according to claim 1,
wherein the heat-resistant resin comprises a mixture of polyamide-imide and polyarylene sulfide, or a mixture of polyamide-imide and polyethersulfone.

7. The composition according to claim 1,
wherein the solvent comprises at least one selected from the group consisting of diethylene glycol, triethylene glycol, tetraethylene glycol, glycerol, diethylene glycol monobutyl ether, tripropylene glycol monomethyl ether, triethylene glycol monomethyl ether, triethylene glycol monobutyl ether, polyethylene glycol monomethyl ether, triethylene glycol dimethyl ether, tetraethylene glycol dimethyl ether, polyethylene glycol dimethyl ether, and 1,4-butanediol.

8. The composition according to claim 1,
wherein the composition is a coating material.

9. The composition according to claim 1,
wherein the composition is a one-coat coating material.

10. A film formed from the composition according to claim 1.

11. A cooking utensil comprising the film according to claim 10.

12. A rice cooker comprising an inner pot that comprises the film according to claim 10.

13. The film according to claim 10, wherein the film has, an adhesiveness value of 20.0 g/cm$^2$ or lower to mochi in a mochi adhesion test.

14. The film according to claim 13,
wherein the film exhibits a result of 100/100 in a cross-cut test.

15. A laminate comprising
a substrate, and
the film according to claim 13 on the substrate.

16. The composition according to claim 1,
wherein the solvent has a boiling point of 271° C. or higher.

* * * * *